US009279356B2

United States Patent
Mase et al.

(10) Patent No.: US 9,279,356 B2
(45) Date of Patent: Mar. 8, 2016

(54) HONEYCOMB STRUCTURE AND MANUFACTURING METHOD OF THE SAME

(71) Applicant: NGK Insulators, Ltd., Nagoya (JP)

(72) Inventors: Kazumi Mase, Nagoya (JP); Yoshimasa Omiya, Nagoya (JP); Atsushi Kaneda, Nagoya (JP); Takashi Noro, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/224,404

(22) Filed: Mar. 25, 2014

(65) Prior Publication Data

US 2014/0294687 A1    Oct. 2, 2014

(30) Foreign Application Priority Data

Mar. 29, 2013 (JP) .................. 2013-075390

(51) Int. Cl.
  *B01D 39/14* (2006.01)
  *B01D 39/06* (2006.01)
  *B01D 39/20* (2006.01)
  *B01D 50/00* (2006.01)
  *B01D 24/00* (2006.01)
  *F01N 3/28* (2006.01)
  *C04B 35/565* (2006.01)
  (Continued)

(52) U.S. Cl.
  CPC .......... *F01N 3/2803* (2013.01); *B01D 46/2425* (2013.01); *B01D 46/2429* (2013.01); *C04B 35/565* (2013.01); *C04B 37/005* (2013.01); *C04B 38/0006* (2013.01); *C04B 38/0019* (2013.01); *F01N 3/2828* (2013.01)

(58) Field of Classification Search
  CPC .... F01N 3/0222; F01N 3/027; B01D 46/0063
  See application file for complete search history.

(56) References Cited

U.S. PATENT DOCUMENTS 5,063,029 A    11/1991   Mizuno et al.
5,288,975 A     2/1994   Kondo
(Continued)

FOREIGN PATENT DOCUMENTS

EP    2 375 019 A2    10/2011
EP    2 505 571 A2    10/2012
(Continued)

OTHER PUBLICATIONS

Extended European Search Report (Application No. 14162307.4) dated Feb. 5, 2015.

*Primary Examiner* — Amber R Orlando (74) *Attorney, Agent, or Firm* — Burr & Brown, PLLC (57) ABSTRACT

A honeycomb structure includes a tubular honeycomb structure body having porous partition walls to define and form a plurality of cells and an outer peripheral wall, and a pair of electrodes disposed on a side surface of the honeycomb structure body. An electrical resistivity of the honeycomb structure body is from 1 to 200 Ωcm, each of the pair of electrodes is formed into a band-like shape extending in an extending direction of the cells of the honeycomb structure body, one electrode in the pair of electrodes is disposed on a side opposite to the other electrode in the pair of electrodes via a center of the honeycomb structure body, the honeycomb structure body is constituted of an outer peripheral region and a central region, and an electrical resistivity of a material constituting the outer peripheral region is lower than an electrical resistivity of a material constituting the central region.

10 Claims, 4 Drawing Sheets

(51) Int. Cl.
  *C04B 37/00* (2006.01)
  *C04B 38/00* (2006.01)
  *B01D 46/24* (2006.01)

(56) References Cited

U.S. PATENT DOCUMENTS

| RE35,134 E | 12/1995 | Mizuno et al. |
| 2003/0134084 A1 | 7/2003 | Ichikawa et al. |
| 2012/0076698 A1* | 3/2012 | Ishihara ............... 422/174 |

FOREIGN PATENT DOCUMENTS

| EP | 2 732 875 A1 | 5/2014 |
| JP | 2931362 B2 | 8/1999 |
| JP | 4136319 B2 | 8/2008 |
| JP | 2011-099405 A1 | 5/2011 |
| WO | 2013/008664 A1 | 1/2013 |

* cited by examiner

HONEYCOMB STRUCTURE AND MANUFACTURING METHOD OF THE SAME

The present application is an application based on JP-2013-075390 filed on Mar. 29, 2013 with the Japanese Patent Office, the entire contents of which are incorporated herein by reference.

BACKGROUND OF THE INVENTION

1. Field of the Invention

The present invention relates to a honeycomb structure and a manufacturing method of the same. More particularly, the present invention relates to a honeycomb structure which is a catalyst carrier and also functions as a heater when a voltage is applied thereto and which can inhibit an unevenness of a temperature distribution when the voltage is applied thereto. Furthermore, the present invention relates to a honeycomb structure manufacturing method which can easily prepare such a honeycomb structure.

2. Description of Related Art

Heretofore, a product in which a catalyst is loaded onto a honeycomb structure made of cordierite has been used for a treatment of harmful substances in an exhaust gas discharged from a car engine. Furthermore, it has also been known that a honeycomb structure formed from a sintered silicon carbide body is used for purification of the exhaust gas (e.g., see Patent Document 1).

When the exhaust gas is treated by the catalyst loaded onto the honeycomb structure, it is necessary to raise the temperature of the catalyst to a predetermined temperature, but the catalyst temperature is low at start of the engine, which has caused a problem that the exhaust gas is not sufficiently purified.

Consequently, there has been investigated a method of disposing a heater made of a metal on an upstream side of the honeycomb structure onto which a catalyst is loaded to raise the temperature of the exhaust gas (e.g., see Patent Document 2).

Furthermore, it has been suggested that a honeycomb structure body made of a ceramic material may be used as "a heatable catalyst carrier" (e.g., see Patent Document 3).

[Patent Document 1] JP 4136319
[Patent Document 2] JP 2931362
[Patent Document 3] JP-A-2011-99405

SUMMARY OF THE INVENTION

When such a heater as described above is mounted and used on a car, a power source for use in an electric system of the car is used in common, for example, a power source of as high voltage as 200 V is used. However, the heater made of the metal has a low electric resistance. Therefore, when the power source of such a high voltage is used, a current excessively flows, which has caused a problem that the power source circuit is damaged.

Furthermore, when the heater is made of metal, a catalyst cannot easily be loaded onto the heater, even if the heater is processed into a honeycomb structure. Therefore, it has been difficult to load the catalyst integrally onto the heater.

Furthermore, in a honeycomb structure body described in Patent Document 3, a pair of electrodes are disposed in a loading body of a honeycomb structure (a cylindrical shape), and a current is allowed to flow from terminals to the electrodes. Heretofore, in the honeycomb structure body of such a structure, the electric resistance of the loading body is larger than an electric resistance of the electrodes. Therefore, the current from the terminals does not immediately flow to the loading body, but flows to both end portions of each electrode (both end portions in an outer peripheral direction of the loading body). Consequently, in such a conventional honeycomb structure body (a heatable catalyst carrier), there has been a problem that a fluctuation of temperature in the loading body occurs. On the contrary, in the honeycomb structure body described in Patent Document 3, the loading body was to be evenly heated by setting the thickness of partition walls of the loading body so as to satisfy predetermined conditions.

However, when the thickness of the partition walls of the loading body is set in accordance with the flow of the current, some brittle portions are locally formed sometimes, which has caused a problem that the mechanical strength deteriorates sometimes.

The present invention has been developed in view of the above-mentioned problem, and an object thereof is to provide a honeycomb structure which is a catalyst carrier and also functions as a heater when a voltage is applied thereto and which can inhibit unevenness of the temperature distribution when the voltage is applied thereto. Furthermore, an object of the present invention is to provide a honeycomb structure manufacturing method which can easily manufacture such a honeycomb structure.

To solve the above-mentioned problems, according to the present invention, the following honeycomb structure and manufacturing method of the honeycomb structure are provided.

According to a first aspect of the present invention, a honeycomb structure including a tubular honeycomb structure body having porous partition walls to define and form a plurality of cells which become through channels for a fluid and extend from an inflow end surface which is an end surface on an inflow side of the fluid to an outflow end surface which is an end surface on an outflow side of the fluid is provided, and an outer peripheral wall positioned in the most outer periphery; and a pair of electrodes disposed on a side surface of the honeycomb structure body, wherein an electrical resistivity of the honeycomb structure body is from 1 to 200 Ωcm, each of the pair of electrodes is formed into a band-like shape extending in an extending direction of the cells of the honeycomb structure body, and in a cross section perpendicular to the cell extending direction, one electrode in the pair of electrodes is disposed on a side opposite to the other electrode in the pair of electrodes via a center of the honeycomb structure body, the honeycomb structure body is constituted of an outer peripheral region including the side surface and a central region as a region of the center which excludes the outer peripheral region, and an electrical resistivity of a material constituting the outer peripheral region is lower than an electrical resistivity of a material constituting the central region.

According to a second aspect of the present invention, the honeycomb structure according to the first aspect is provided, wherein the honeycomb structure body and the electrodes are made of a material including silicon carbide.

According to a third aspect of the present invention, the honeycomb structure according to the first or second aspects is provided, wherein in the cross section perpendicular to the cell extending direction, a length of a current path is 1.6 times or less a diameter of the honeycomb structure body.

According to a fourth aspect of the present invention, the honeycomb structure according to any one of the first to third aspects is provided, wherein the outer peripheral region has a boundary region in a boundary portion between the outer peripheral region and the central region, and the boundary region is a region where the electrical resistivity gradually changes so that the electrical resistivity lowers toward the closer boundary portion to the central region.

According, to a fifth aspect of the present invention, a manufacturing method of a honeycomb structure having a formed honeycomb body preparing step of extrusion-forming a forming raw material containing a ceramic raw material is provided, to prepare a formed honeycomb body having partition walls to define and form a plurality of cells which become through channels for a fluid and extend from one end surface to the other end surface and an outer peripheral wall positioned in the most outer periphery; a dried honeycomb body preparing step of drying the formed honeycomb body to prepare a dried honeycomb body; a fired honeycomb body preparing step of firing the dried honeycomb body to prepare a fired honeycomb body; a preparing step of the fired honeycomb body with unfired electrodes in which an electrode forming raw material containing a ceramic raw material is applied to a side surface of the fired honeycomb body and dried to form the unfired electrodes, thereby preparing the fired honeycomb body with the unfired electrodes; and a honeycomb structure preparing step of firing the fired honeycomb body with the unfired electrodes to prepare the honeycomb structure, wherein in the fired honeycomb body preparing step, the dried honeycomb body is fired in a state where a plurality of particles containing silicon as a main component are in contact with the side surface of the dried honeycomb body.

According to a sixth aspect of the present invention, a manufacturing method of a honeycomb structure having a formed honeycomb body preparing step of extrusion-forming a forming raw material containing a ceramic raw material is provided, to prepare a formed honeycomb body having partition walls to define and form a plurality of cells which become through channels for a fluid and extend from one end surface to the other end surface and an outer peripheral wall positioned in the most outer periphery; a dried honeycomb body preparing step of drying the formed honeycomb body to prepare a dried honeycomb body; a preparing step of the dried honeycomb body with unfired electrodes in which an electrode forming raw material containing a ceramic raw material is applied to a side surface of the dried honeycomb body and dried to form the unfired electrodes, thereby preparing the dried honeycomb body with the unfired electrodes; and a honeycomb structure preparing step of firing the dried honeycomb body with the unfired electrodes to prepare the honeycomb structure, wherein in the honeycomb structure preparing step, the dried honeycomb body with the unfired electrodes is fired in a state where a plurality of particles containing silicon as a main component are in contact with the side surface of the dried honeycomb body with the unfired electrodes.

In the honeycomb structure of the present invention, the electrical resistivity of the outer peripheral region is lower than the electrical resistivity of the central region. Therefore, when a voltage is applied to the honeycomb structure, the current from electrodes easily flows to a honeycomb structure body (carrier). Consequently, the honeycomb structure body easily evenly generates heat.

A first honeycomb structure manufacturing method of the present invention includes, in the fired honeycomb body preparing step, firing a dried honeycomb body in a state where a plurality of particles containing silicon as a main component are in contact with the side surface of the dried honeycomb body. Therefore, when the dried honeycomb body is fired, silicon contained in "the plurality of particles containing silicon as the main component" permeates the dried honeycomb body (the fired honeycomb body) from the side surface thereof. Furthermore, "the outer peripheral region which is a region made of a material having an electrical resistivity lower than that of a material constituting the central region" is accordingly easily formed.

In a second honeycomb structure manufacturing method of the present invention, a dried honeycomb body with unfired electrodes is fired in a state where a plurality of particles containing silicon as a main component are in contact with the side surface of the dried honeycomb body with the unfired electrodes. Therefore, when the dried honeycomb body with the unfired electrodes is fired, silicon contained in "the plurality of particles containing silicon as the main component" permeates the dried honeycomb body with the unfired electrodes (the honeycomb structure) from the side surface thereof. Furthermore, "the outer peripheral region which is the region made of the material having the electrical resistivity lower than that of the material constituting the central region" is accordingly easily formed.

DETAILED DESCRIPTION OF THE INVENTION

Next, embodiments of the present invention will be described in detail with reference to the drawings. It should be understood that the present invention is not limited to embodiments in the following and that changes, improvements and the like can suitably be added on the basis of ordinary knowledge of a person skilled in the art without departing from the gist of the present invention.

Figure 1:
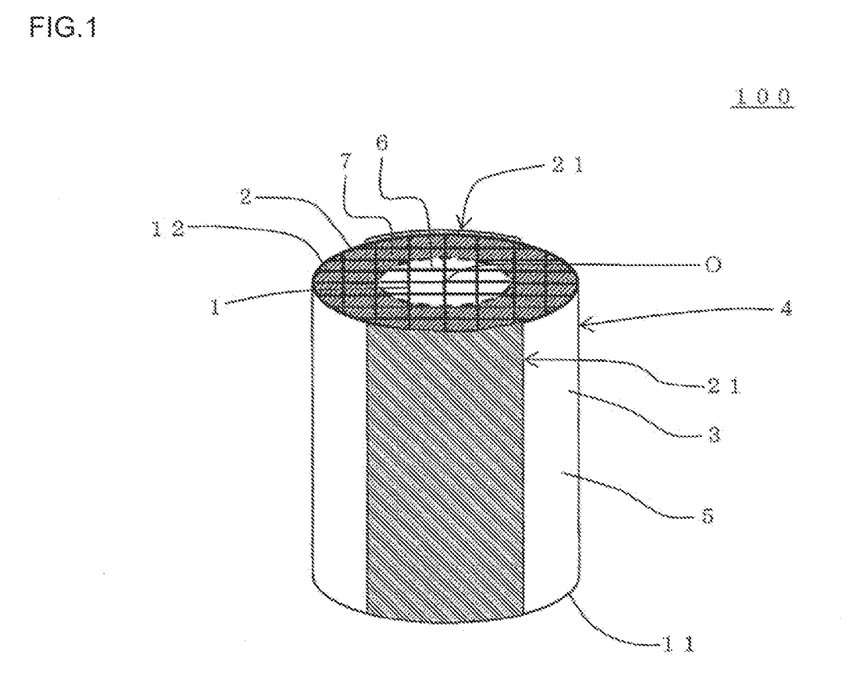
FIG. 1 is a perspective view schematically showing one embodiment of the honeycomb structure of the present invention.
Figure 2:
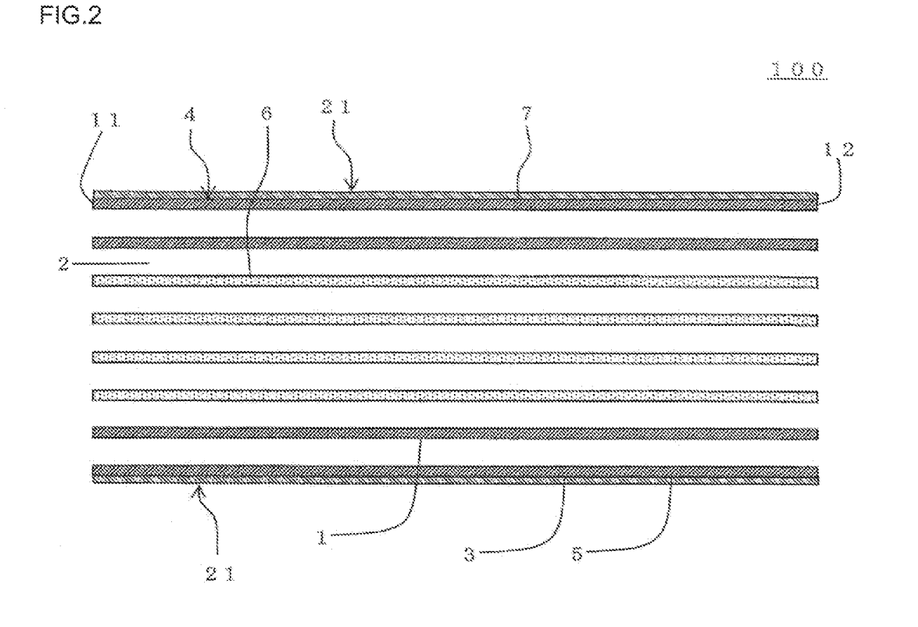
FIG. 2 is a schematic view showing a cross section parallel to the cell extending direction in the one embodiment of the honeycomb structure of the present invention.
Figure 3:
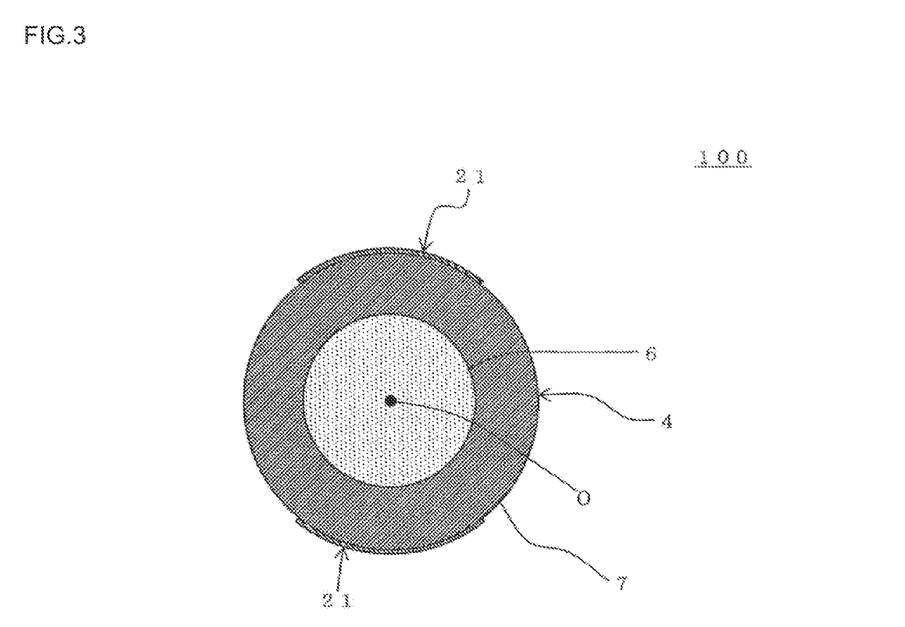
FIG. 3 is a schematic view showing a cross section perpendicular to the cell extending direction in the one embodiment of the honeycomb structure of the present invention.
Figure 4:
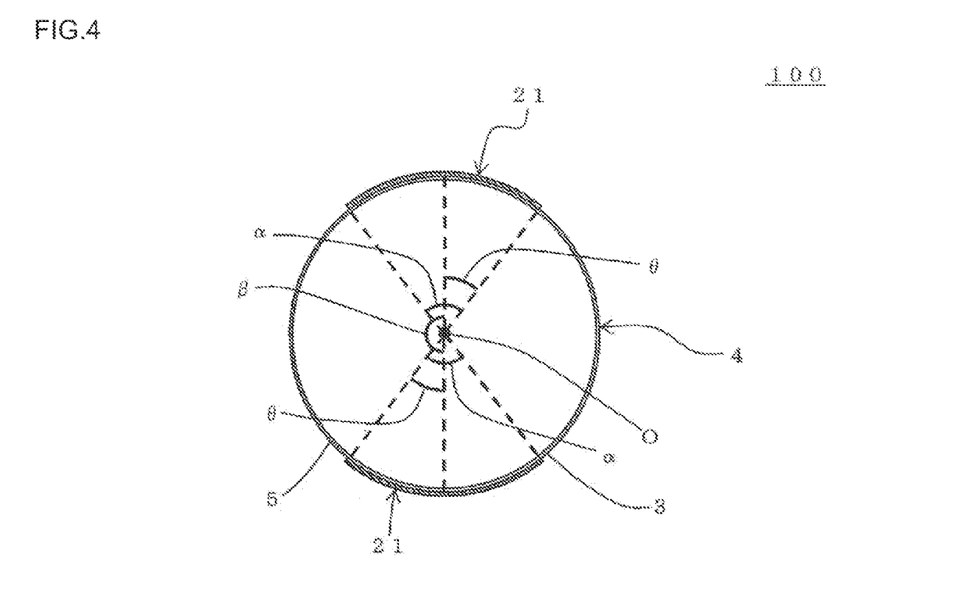
FIG. 4 is a schematic view showing a cross section perpendicular to the cell extending direction in the one embodiment of the honeycomb structure of the present invention.

(1) Honeycomb Structure:

As shown in FIG. 1 to FIG. 4, one embodiment of a honeycomb structure of the present invention includes a tubular honeycomb structure body 4 and a pair of electrodes 21, 21 disposed on a side surface 5 of the honeycomb structure body 4. The honeycomb structure body 4 has porous partition walls 1 to define and form a plurality of cells 2 which become through channels for a fluid and extend from an inflow end surface 11 which is an end surface on an inflow side of the fluid to an outflow end surface 12 which is an end surface on an outflow side of the fluid, and an outer peripheral wall 3 positioned in the most outer periphery. Furthermore, the electrical resistivity of the honeycomb structure body 4 is from 1 to 200 Ωcm. Furthermore, each of the pair of electrodes 21, 21 is formed into a band-like shape extending in an extending direction of the cells 2 of the honeycomb structure body 4. Furthermore, in a cross section perpendicular to the extending direction of the cells 2, one electrode 21 in the pair of electrodes 21, 21 is disposed on the side opposite to the other electrode 21 in the pair of electrodes 21, 21 via the center O of the honeycomb structure body 4. Furthermore, the honeycomb structure body 4 is constituted of an outer peripheral region 7 including the side surface 5 and a central region 6 as a region of the center which excludes the outer peripheral region 7. Furthermore, the electrical resistivity of the material constituting the outer peripheral region 7 is lower than an electrical resistivity of a material constituting the central region 6. FIG. 1 is a perspective view schematically showing one embodiment (honeycomb structure 100) of the honeycomb structure of the present invention. FIG. 2 is a schematic view showing a cross section parallel to the cell extending direction in the one embodiment of the honeycomb structure of the present invention. FIG. 3 is a schematic view showing a cross section perpendicular to the cell extending direction in the one embodiment of the honeycomb structure of the present invention. FIG. 4 is a schematic view showing a cross section perpendicular to the cell extending direction in the one embodiment of the honeycomb structure of the present invention. It is to be noted that in FIG. 3, the partition walls are omitted. Moreover, in FIG. 4, the partition walls are omitted, and furthermore, the central region and the outer peripheral region are not shown.

As described above, in the honeycomb structure 100 of the present embodiment, the electrical resistivity of the honeycomb structure body 4 is from 1 to 200 Ωcm. Therefore, even when a current is allowed to flow by using a power source of a high voltage, the current does not excessively flow, so that the honeycomb structure can suitably be used as a heater. Furthermore, in the honeycomb structure 100 of the present embodiment, each of the pair of electrodes 21, 21 is formed into the band-like shape extending in the extending direction of the cells 2 of the honeycomb structure body 4. Furthermore, in the cross section perpendicular to the extending direction of the cells 2, the one electrode 21 in the pair of electrodes 21, 21 is disposed on the side opposite to the other electrode 21 in the pair of electrodes 21, 21 via the center of the honeycomb structure body 4. Therefore, it is possible to inhibit an unevenness of a temperature distribution in the honeycomb structure body 4 when the voltage is applied between the pair of electrodes 21, 21. It is to be noted that the temperature of the central region 6 may be different from the temperature of the outer peripheral region 7. "The unevenness of the temperature distribution in the honeycomb structure body 4" means that the temperature of some portion of the honeycomb structure body 4 is locally high or locally low.

Furthermore, in the honeycomb structure 100 of the present embodiment, the electrical resistivity of the material constituting the outer peripheral region 7 is lower than the electrical resistivity of the material constituting the central region 6. Therefore, when the voltage is applied between the pair of electrodes 21, 21 of the honeycomb structure 100, the current easily flows to the outer peripheral region 7. Therefore, the amount of the current to be transmitted to the end portions of the electrodes 21, 21 is decreased, and the unevenness of the temperature distribution in the honeycomb structure body 4 is decreased. That is, the honeycomb structure body (the honeycomb structure) can easily evenly generate heat.

Here, when "in the cross section perpendicular to the extending direction of the cells 2, the one electrode 21 in the pair of electrodes 21, 21 is disposed on the side opposite to the other electrode 21 in the pair of electrodes 21, 21 via the center O of the honeycomb structure body 4", the following is meant. In the cross section perpendicular to the extending direction of the cells 2, "a line segment connecting the central point of the one electrode 21 (central point in "the peripheral direction of the honeycomb structure body 4") to the center O of the honeycomb structure body 4" is to be a first line segment. In the cross section perpendicular to the extending direction of the cells 2, "a line segment connecting the central point of the other electrode 21 (central point in "the peripheral direction of the honeycomb structure body 4") to the center O of the honeycomb structure body 4" is to be a second line segment. Then the pair of electrodes 21, 21 are disposed in the honeycomb structure body 4 in such a positional relation that an angle β formed by the first line segment and the second line segment (an angle around "the center O" (see FIG. 4)) is in a range of 170° to 190°. Moreover, as shown in FIG. 4, "a central angle α of the electrode 21" is an angle formed by two line segments connecting both ends of the electrode 21 to the center O of the honeycomb structure body 4 in the cross section perpendicular to the cell extending direction. Furthermore, "the central angle α of the electrode 21" can also be described as follows. In the cross section perpendicular to the cell extending direction, "a line segment connecting one end portion of the electrode 21 to the center O" is to be a third line segment. In the cross section perpendicular to the cell extending direction, "a line segment connecting the other end portion of the electrode 21 to the center O" is to be a fourth line segment. Then "the central angle α of the electrode 21" is an inner angle of a portion of the center O in a shape formed by "the electrode 21", the third line segment, and the fourth line segment (e.g., a fan shape) in the cross section perpendicular to the cell extending direction.

A value of a ratio of the electrical resistivity of the outer peripheral region 7 to the electrical resistivity of the central region 6 (the outer peripheral region/the central region) is preferably from 0.45 to 0.95 and further preferably from 0.5 to 0.8. When "the outer peripheral region/the central region" is lower than 0.45, the current flows more than necessary sometimes. When "the outer peripheral region/the central region" is higher than 0.95, the heat generation may be uneven. Furthermore, there is a fear that cracks are disadvantageously generated caused by energization. The electrical resistivity is a value measured by a four-terminal method.

In the honeycomb structure 100 of the present embodiment, the central region 6 is a region positioned in a central portion (a portion which does not include the side surface) of the honeycomb structure body 4 in the cross section perpendicular to the cell extending direction. Furthermore, the central region 6 is a region positioned so as to extend through the central portion of the honeycomb structure body from the inflow end surface 11 to the outflow end surface 12. As shown in FIG. 1, when the honeycomb structure body 4 has a cylindrical shape, the central region 6 preferably also has a cylindrical shape. In this case, the central axis of the honeycomb structure body preferably coincides with the central axis of the central region.

In the honeycomb structure 100 of the present embodiment, a distance from the center O to the outer periphery of the central region 6 (a central region radius) is preferably from 40 to 90% of a distance from the center O to an outer periphery (the side surface) of the outer peripheral region 7 (an outer peripheral region radius) in the cross section perpendicular to the cell extending direction. Moreover, the central region radius is further preferably from 50 to 80% of the outer peripheral region radius. When the percentage is smaller than 40%, the current flows through the whole structure more than necessary sometimes during the application of the voltage. When the percentage is larger than 90%, the effect that "it is possible to inhibit the unevenness of the temperature distribution when the voltage is applied" deteriorates sometimes.

In the honeycomb structure 100 of the present embodiment, the electrical resistivity of the material constituting the outer peripheral region 7 is lower than the electrical resistivity of the material constituting the central region 6. In consequence, the electrical resistivities of the outer peripheral region 7 and the central region 6 can easily be regulated simply by changing the raw material used in the preparation of the honeycomb structure (the honeycomb structure body).

In the honeycomb structure 100 of the present embodiment, the honeycomb structure body 4 and the electrodes 21 are preferably made of a material including silicon carbide. An example of the material including silicon carbide is a material containing a silicon-silicon carbide composite material, silicon carbide or the like as a main component. In these examples, the material containing the silicon-silicon carbide composite material as the main component is further preferable. Furthermore, the material constituting the honeycomb structure body 4 and the electrodes 21 is especially preferably a material containing 95 mass % or more of the silicon-silicon carbide composite material. In the present description, when "the material is the silicon-silicon carbide composite material", it is meant that the material contains 95 mass % or more of "the silicon-silicon carbide composite material". Here, "the main component" is a component contained as much as 90 mass % or more in the whole material. The silicon-silicon carbide composite material is a material in which a plurality of silicon carbide particles are bound by metal silicon. The silicon-silicon carbide composite material is preferably porous, because "the plurality of silicon carbide particles are bound by metal silicon so that pores are formed among the silicon carbide particles". By use of such a material, the electrical resistivity of the honeycomb structure body can be from 1 to 200 Ωcm. The electrical resistivity of the honeycomb structure body is a value at 400° C. Furthermore, when the honeycomb structure body 4 and the electrodes 21 contain the silicon carbide particles and silicon as the main components, the components of the electrodes 21 and the components of the honeycomb structure body 4 are the same components or close components. Therefore, thermal expansion coefficients of the electrodes 21 and the honeycomb structure body 4 have the same value or close values. Furthermore, since the materials are the same or close to each other, the bonding strength between the electrode 21 and the honeycomb structure body 4 heightens. Therefore, even when heat stress is applied to the honeycomb structure, the electrodes 21 can be prevented from being peeled from the honeycomb structure body 4, or the bonding portion between the electrode 21 and the honeycomb structure body 4 can be prevented from being damaged.

Moreover, when the material of the outer peripheral region 7 and the central region 6 is the silicon-silicon carbide composite material, the outer peripheral region 7 has "a higher content ratio of metal silicon in the silicon-silicon carbide composite material than the central region 6", to preferably obtain a low electrical resistivity.

When the material of the outer peripheral region 7 is the silicon-silicon carbide composite material, the content ratio of metal silicon in the silicon-silicon carbide composite material is preferably from 10 to 50 mass % and further preferably from 20 to 40 mass %. When the content ratio is smaller than 10 mass %, the electrical resistivity of the outer peripheral region 7 may be excessively high. When the content ratio is larger than 50 mass %, the electrical resistivity of the outer peripheral region 7 may be excessively low.

When a material of "another region in the central region" is the silicon-silicon carbide composite material in the central region 6, the content ratio of metal silicon in the silicon-silicon carbide composite material is preferably from 10 to 50 mass % and further preferably from 10 to 30 mass %. When the content ratio is smaller than 10 mass %, the electrical resistivity of "the other region in the central region" may be excessively high. When the content ratio is larger than 50 mass %, the electrical resistivity of "the other region in the central region" may be excessively low.

Figure 5:
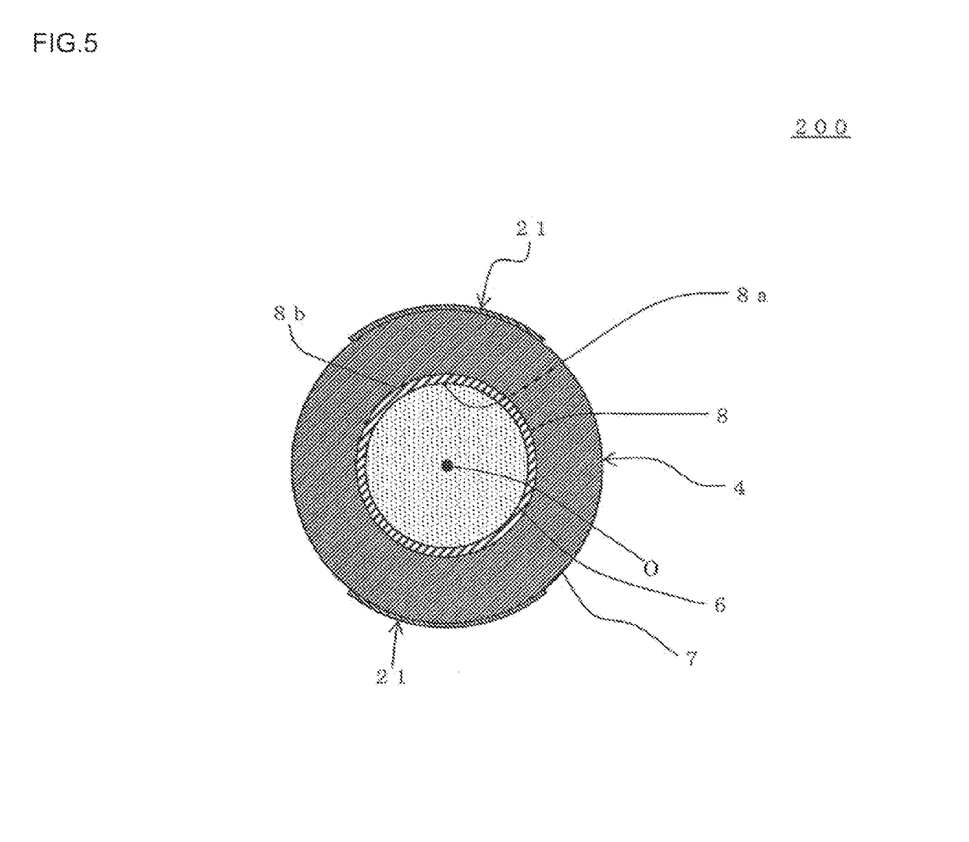
FIG. 5 is a schematic view showing a cross section perpendicular to the cell extending direction in another embodiment of the honeycomb structure of the present invention.

In the honeycomb structure of the present invention, the outer peripheral region 7 preferably has a boundary region 8 in a boundary portion between the outer peripheral region 7 and the central region 6 (see FIG. 5). Furthermore, the boundary region 8 is preferably a region where the electrical resistivity gradually changes so that the electrical resistivity is higher toward the closer boundary portion to the central region 6. The boundary region 8 is a region "from "an end 8b on the side of the outer peripheral region 7" to "a boundary 8a with the central region 6"" where the electrical resistivity changes at a ratio of 0.1 Ωcm/cm or more. That is, in the boundary region 8 "from the end 8b on the side of outer peripheral region 7 to the boundary 8a with the central region 6" in the cell extending direction, a change ratio of the electrical resistivity is 0.1 Ωcm/cm or more. In the boundary region 8 "from the end 8b on the side of outer peripheral region 7 to the boundary 8a with the central region 6" in the cell extending direction, the change ratio of the electrical resistivity is preferably from 0.1 to 10 Ωcm/cm. Furthermore, the change ratio of the electrical resistivity is further preferably from 0.5 to 10 Ωcm/cm. When the change ratio is larger than 10 Ωcm/cm, there is a fear that current concentration occurs in the boundary region to cause cracks or short circuit. A thickness of the boundary region 8 (a value obtained by subtracting the distance between the center O and "the boundary 8a with the central region" from the distance between the center O and "the end 8b on the outer peripheral region side") is preferably from 3 to 30% of "the distance from the center O to the outer periphery" of the honeycomb structure body. Furthermore, the thickness of the boundary region 8 is further preferably from 3 to 20% of "the distance from the center O to the outer periphery" of the honeycomb structure body. When the percentage is smaller than 3%, there is the fear that the current concentration occurs in the boundary region to cause the cracks or the short circuit. When the material forming the outer peripheral region 7 is "the silicon-silicon carbide composite material", the boundary region 8 preferably has the following constitution. That is, the boundary region 8 is preferably formed so that "the content ratio of metal silicon gradually changes "from the end 8b on the side of the outer peripheral region 7 to the boundary 8a with the central region 6"", whereby the electrical resistivity changes. It is to be noted that when the outer peripheral region 7 has the boundary region 8, the electrical resistivity of the outer peripheral region 7 is the electrical resistivity of the whole outer peripheral region 7 including the boundary region 8. FIG. 5 is a front view schematically showing another embodiment of the honeycomb structure of the present invention (honeycomb structure 200). The honeycomb structure 200 of the present embodiment is preferably similar to the one embodiment of the honeycomb structure of the present invention (honeycomb structure 100 (see FIG. 1)), except that the honeycomb structure 200 has the boundary region 8.

In the honeycomb structure 100 of the present embodiment, as shown in FIG. 1 to FIG. 4, the pair of electrodes 21, 21 are disposed on the side surface 5 of the honeycomb structure body 4. The honeycomb structure 100 of the present embodiment generates heat when the voltage is applied between the pair of electrodes 21, 21. The voltage to be applied is preferably from 12 to 900 V and further preferably from 64 to 600 V.

In the honeycomb structure 100 of the present embodiment, when a material forming the honeycomb structure body 4 is "the silicon-silicon carbide composite material", an average particle diameter of the silicon carbide particles (aggregates) constituting the honeycomb structure body 4 is preferably from 3 to 50 μm. Furthermore, the average particle diameter of the silicon carbide particles (aggregates) constituting the honeycomb structure body 4 is further preferably from 3 to 40 μm. When the average particle diameter of the silicon carbide particles constituting the honeycomb structure body 4 is in such a range, the electrical resistivity of the honeycomb structure body 4 at 400° C. can be from 1 to 200 Ωcm. When the average particle diameter of the silicon carbide particles is smaller than 3 μm, the electrical resistivity of the honeycomb structure body 4 may be large. When the average particle diameter of the silicon carbide particles is larger than 50 μm, the electrical resistivity of the honeycomb structure body 4 may be small. Furthermore, when the average particle diameter of the silicon carbide particles is larger than 50 μm, the die for extrusion-forming may be clogged with the forming raw material during the extrusion-forming of the formed honeycomb body. The average particle diameter of the silicon carbide particles is a value measured by laser diffraction method.

A porosity of the partition walls 1 of the honeycomb structure body 4 is preferably from 35 to 60% and further preferably from 35 to 45%. When the porosity is smaller than 35%, deformation during firing may be disadvantageously large. When the porosity is in excess of 60%, the strength of the honeycomb structure may deteriorate. The porosity is a value measured by mercury porosimeter.

An average pore diameter of the partition walls 1 of the honeycomb structure body 4 is preferably from 2 to 15 μm and further preferably from 4 to 8 μm. When the average pore diameter is smaller than 2 μm, the electrical resistivity may be excessively large. When the average pore diameter is larger than 15 μm, the electrical resistivity may be excessively small. The average pore diameter is a value measured by the mercury porosimeter.

In the honeycomb structure 100 of the present embodiment, a thickness of the partition walls 1 of the honeycomb structure body 4 is preferably from 50 to 200 μm and further preferably from 70 to 180 μm. The thickness of the partition walls is in such a range, whereby when the honeycomb structure 100 is used as a catalyst carrier and catalyst is loaded thereonto, the pressure loss during the flowing of an exhaust gas can be prevented from being excessively large. When the thickness of the partition walls is smaller than 50 μm, the strength of the honeycomb structure may deteriorate. When the thickness of the partition walls is larger than 200 μm, the pressure loss during the flowing of the exhaust gas may be large, in the case where the honeycomb structure 100 is used as a catalyst carrier and catalyst is loaded thereonto.

In the honeycomb structure 100 of the present embodiment, a cell density of the honeycomb structure body 4 is preferably from 40 to 150 cells/cm$^2$ and further preferably from 70 to 100 cells/cm$^2$. When the cell density is in such a range, the purification performance of the catalyst can be heightened while the pressure loss during the flowing of the exhaust gas is small. When the cell density is lower than 40 cells/cm$^2$, the catalyst loading area may be decreases. When the cell density is higher than 150 cells/cm$^2$, the pressure loss during the flowing of the exhaust gas may be large, in the case where the honeycomb structure 100 is used as a catalyst carrier with catalyst loaded thereonto.

There is not any special restriction on a shape of the honeycomb structure 100 (shape of the honeycomb structure body 4) of the present embodiment, and examples of the shape include a tubular shape with a bottom surface having a round shape (cylindrical shape), a tubular shape with a bottom surface having an oval shape, a tubular shape with a bottom surface having a polygonal shape (quadrangular shape, pentangular shape, hexagonal shape, heptagonal shape, octagonal shape or the like), and the like. Furthermore, as to a size of the honeycomb structure (honeycomb structure body), an area of the bottom surface is from 2000 to 20000 mm$^2$ and further preferably from 4000 to 10000 mm$^2$. Furthermore, a length of the honeycomb structure (honeycomb structure body) in a central axis direction is preferably from 50 to 200 mm and further preferably from 75 to 150 mm. Moreover, a diameter of each end surface of the honeycomb structure body is preferably three times or less, further preferably from 0.5 to 2.5 times, and especially preferably from 0.8 times to twice a length of the honeycomb structure body in the cell extending direction. When the diameter of the end surface of the honeycomb structure body is in excess of three times the length of the honeycomb structure body in the cell extending direction, the honeycomb volume may be small, and hence it may not be possible to load such an amount of the catalyst as to sufficiently exert the purification performance of the exhaust gas.

Furthermore, in the honeycomb structure 100 of the present embodiment, a thickness of the outer peripheral wall 3 constituting the most outer periphery of the honeycomb structure body 4 is preferably from 0.1 to 2 mm. When the thickness is smaller than 0.1 mm, the strength of the honeycomb structure 100 may deteriorate. When the thickness is larger than 2 mm, the area of each partition wall onto which the catalyst is to be loaded may decrease.

In the honeycomb structure 100 of the present embodiment, a shape of the cells 2 in the cross section perpendicular to the extending direction of the cells 2 is preferably a quadrangular shape, a hexagonal shape, an octagonal shape, or any combination of these shapes. When the cell shape is in such a shape, the pressure loss during the flowing of the exhaust gas through the honeycomb structure 100 is small, and the purification performance of the catalyst is excellent.

As shown in FIG. 1 to FIG. 4, in the honeycomb structure 100 of the present embodiment, each of the pair of electrodes 21, 21 is formed into "the band-like shape" extending in the extending direction of the cells 2 of the honeycomb structure body 4. Furthermore, in the cross section perpendicular to the extending direction of the cells 2, the one electrode 21 in the pair of electrodes 21, 21 is disposed on the side opposite to the other electrode 21 in the pair of electrodes 21, 21 via the center O of the honeycomb structure body 4. As such, in the honeycomb structure 100 of the present embodiment, the electrode 21 is formed into the band-like shape, a longitudinal direction of the electrode 21 is the extending direction of the cells 2 of the honeycomb structure body 4, and the pair of electrodes 21, 21 are disposed on the opposite sides via the center O of the honeycomb structure body 4. Therefore, when the voltage is applied between the pair of electrodes 21, 21, it is possible to inhibit the unevenness of the current flowing through the outer peripheral region 7 and the central region 6, respectively. In consequence, it is possible to inhibit the unevenness of the heat generation in the outer peripheral region 7 and the central region 6, respectively.

Furthermore, in the cross section perpendicular to the extending direction of the cells 2, an angle of 0.5 time the central angle α of each of the pair of electrodes 21, 21 (angle θ of 0.5 time the central angle α) is preferably from 15 to 65°. Furthermore, in the cross section perpendicular to the extending direction of the cells 2, an upper limit value of "the angle θ of 0.5 time the central angle α" of each of the electrodes 21, 21 is preferably 60° and further preferably 55°. Furthermore, in the cross section perpendicular to the extending direction of the cells 2, a lower limit value of "the angle θ of 0.5 time the central angle α" of each of the electrodes 21, 21 is preferably 20° and further preferably 30°. Furthermore, "the angle θ of 0.5 times the central angle α" of the one electrode 21 preferably has a size of 0.8 to 1.2 times and further preferably a size of 1.0 time (the same size) to "the angle θ of 0.5 times the central angle α" of the other electrode 21. In consequence, when the voltage is applied between the pair of electrodes 21, 21, it is possible to inhibit the unevenness of the current flowing through each of the outer peripheral region 7 and the central region 6. Furthermore, it is accordingly possible to inhibit the unevenness of the heat generation in each of the outer peripheral region 7 and the central region 6.

In the honeycomb structure 100 of the present embodiment, an electrical resistivity of the electrode 21 is preferably lower than the electrical resistivity of the outer peripheral region 7 of the honeycomb structure body 4. Furthermore, the electrical resistivity of the electrode 21 is further preferably from 0.1 to 10% and especially preferably from 0.5 to 5% of the electrical resistivity of the outer peripheral region 7 of the honeycomb structure body 4. When the percentage is lower than 0.1%, during the application of the voltage to the electrode 21, the amount of the current flowing through the electrode 21 to "the end portion of the electrode" increases, and hence an unevenness may easily be generated in the current flowing though the honeycomb structure body. Furthermore, the heat may not easily evenly be generated in the honeycomb structure body. When the percentage is higher than 10%, during the application of the voltage to the electrode 21, the amount of the current spreading in the electrode 21 decreases, and hence the unevenness may easily be generated in the current flowing though the honeycomb structure body. Furthermore, the heat may not easily evenly be generated in the honeycomb structure body.

A thickness of the electrode 21 is preferably from 0.01 to 5 mm and further preferably from 0.01 to 3 mm. In such a range, the heat can evenly be generated in each of the outer peripheral region 7 and the central region 6. When the thickness of the electrode 21 is smaller than 0.01 mm, electric resistance heightens, and hence the heat cannot evenly be generated. When the thickness is larger than 5 mm, the electrodes may be damaged during canning.

As shown in FIG. 1 and FIG. 2, in the honeycomb structure 100 of the present embodiment, each of the pair of electrodes 21, 21 is formed into the band-like shape extending in the extending direction of the cells 2 of the honeycomb structure body 4 and "extending between both the end portions (between both the end surfaces 11 and 12)". As such, in the honeycomb structure 100 of the present embodiment, the pair of electrodes 21, 21 are disposed so as to extend between both end portions of the honeycomb structure body 4. In consequence, it is possible to more effectively inhibit the unevenness of the current flowing through each of the outer peripheral region 7 and the central region 6 when the voltage is applied between the pair of electrodes 21, 21. Here, when "the electrode 21 is formed (disposed) so as to extend between both end portions of the honeycomb structure body 4", the following is meant. That is, it is meant that one end portion of the electrode 21 comes in contact with one end portion (one end surface) of the honeycomb structure body 4, and the other end portion of the electrode 21 comes in contact with the other end portion (the other end surface) of the honeycomb structure body 4.

On the other hand, it is also preferable that at least one end portion of the electrode 21 in "the extending direction of the cells 2 of the honeycomb structure body 4" does not come in contact with (does not reach) the end portion (the end surface) of the honeycomb structure body 4. In consequence, heat shock resisting properties of the honeycomb structure can be enhanced.

In the honeycomb structure 100 of the present embodiment, for example, as shown in FIG. 1 to FIG. 4, the electrode 21 has such a shape as obtained by curving a planar rectangular member along an outer periphery of a cylindrical shape. Here, a shape obtained when the curved electrode 21 is deformed into a planar member which is not curved will be referred to as "the planar shape" of the electrode 21. The above-mentioned "planar shape" of the electrode 21 shown in FIG. 1 to FIG. 4 is a rectangular shape. Furthermore, "an outer peripheral shape of the electrode" means "the outer peripheral shape in the planar shape of the electrode".

In the honeycomb structure 100 of the present embodiment, the outer peripheral shape of the band-like electrode may be a shape in which corner portions of the rectangular shape are curved. According to such a shape, the heat shock resisting properties of the honeycomb structure can be enhanced. It is also preferable that the outer peripheral shape of the band-like electrode is a shape in which the corner portions of the rectangular shape are linearly chamfered. According to such a shape, the heat shock resisting properties of the honeycomb structure can be enhanced.

In the honeycomb structure 100 of the present embodiment, in the cross section perpendicular to the cell extending direction, a length of the current path is preferably 1.6 times or less the diameter of the honeycomb structure body. In excess of 1.6 times, energy may disadvantageously unnecessarily be consumed. Here, "the current path" is a path through which the current flows. Furthermore, "the length of the current path" is a length of 0.5 times a length of "the outer periphery" where the current flows, in "the cross section perpendicular to the cell extending direction" of the honeycomb structure body. This means the maximum length in "the path through which the current flows" in "the cross section perpendicular to the cell extending direction" of the honeycomb structure body. When a concave or a convex is formed in the outer periphery or when a slit opened in the outer periphery is formed in the honeycomb structure body, "the length of the current path" is a value measured along the surface of the concave/convex or the slit. Therefore, for example, when a slit opened in the outer periphery is formed in the honeycomb structure body, "the length of the current path" increases as much as a length of about twice a depth of the slit.

The electrical resistivity of the electrode 21 is preferably from 0.1 to 100 Ωcm and further preferably from 0.1 to 50 Ωcm. When the electrical resistivity of the electrode 21 is in such a range, each of the pair of electrodes 21, 21 effectively performs the function as an electrode in a piping line where the exhaust gas of a high temperature flows. When the electrical resistivity of the electrode 21 is smaller than 0.1 Ωcm, the temperature of the honeycomb portion in the vicinity of each end of the electrode 21 in the cross section perpendicular to the cell extending direction may easily rise. When the electrical resistivity of the electrode 21 is larger than 100 Ωcm, the current does not easily flow, and hence the function as the electrode may not easily be performed. The electrical resistivity of the electrode is a value at 400° C.

A porosity of the electrode 21 is preferably from 30 to 60% and further preferably from 30 to 55%. When the porosity of the electrode 21 is in such a range, a suitable electrical resistivity can be obtained. When the porosity of the electrode 21 is lower than 30%, the electrode may disadvantageously be deformed sometimes during manufacturing. When the porosity of the electrode 21 is higher than 60%, the electrical resistivity may be excessively high. The porosity is a value measured by mercury porosimeter.

An average pore diameter of the electrode 21 is preferably from 5 to 45 µm and further preferably from 7 to 40 µm. When the average pore diameter of the electrode 21 is in such a range, the suitable electrical resistivity can be obtained. When the average pore diameter of the electrode 21 is smaller than 5 µm, the electrical resistivity may be excessively high. When the average pore diameter of the electrode 21 is larger than 45 µm, the strength of the electrode 21 weakens and hence the electrode may easily be damaged. The average pore diameter is a value measured by mercury porosimeter.

When the main component of the electrode 21 is "silicon-silicon carbide composite material", an average particle diameter of silicon carbide particles contained in the electrode 21 is preferably from 10 to 60 µm and further preferably from 20 to 60 µm. When the average particle diameter of the silicon carbide particles contained in the electrode 21 is in such a range, the electrical resistivity of the electrode 21 can be controlled in the range of 0.1 to 100 Ωcm. When the average particle diameter of the silicon carbide particles contained in the electrode 21 is smaller than 10 µm, the electrical resistivity of the electrode 21 may be excessively large. When the average particle diameter of the silicon carbide particles contained in the electrode 21 is larger than 60 µm, the strength of the electrode 21 weakens and the electrode may easily be damaged. The average particle diameter of the silicon carbide particles contained in the electrode 21 is a value measured by laser diffraction method.

When the main component of the electrode 21 is "silicon-silicon carbide composite material", a ratio of the mass of silicon contained in the electrode 21 to "the total of respective masses of the silicon carbide particles and silicon" contained in the electrode 21 is preferably from 20 to 40 mass %. Furthermore, the ratio of the mass of silicon to "the total of the respective masses of the silicon carbide particles and silicon" contained in the electrode 21 is further preferably from 25 to 35 mass %. When the ratio of the mass of silicon to "the total of the respective masses of the silicon carbide particles and silicon" contained in the electrode 21 is in such a range, the electrical resistivity of the electrode 21 can be in a range of 0.1 to 100 Ωcm. When the ratio of the mass of silicon to "the total of the respective masses of the silicon carbide particles and silicon" contained in the electrode 21 is smaller than 20 mass %, the electrical resistivity may be excessively large. When the ratio is larger than 40 mass %, the electrode may easily be deformed during the manufacturing.

An isostatic strength of the honeycomb structure 100 of the present embodiment is preferably 1 MPa or more and further preferably 3 MPa or more. A larger value of the isostatic strength is more preferable, however an upper limit of the value is about 6 MPa when the material, structure and the like of the honeycomb structure 100 are taken into consideration. When the isostatic strength is smaller than 1 MPa, the honeycomb structure may easily be damaged during the use of the honeycomb structure as a catalyst carrier. The isostatic strength is a value measured under static pressure in water.

(2) First Honeycomb Structure Manufacturing Method:

Next, one embodiment of a first honeycomb structure manufacturing method of the present invention will be described.

The one embodiment of the first honeycomb structure manufacturing method of the present invention has a formed honeycomb body preparing step, a dried honeycomb body preparing step, a fired honeycomb body preparing step, a preparing step of the fired honeycomb body with unfired electrodes, and a honeycomb structure preparing step. Furthermore, in the manufacturing method of the honeycomb structure of the present embodiment, in the fired honeycomb body preparing step, a dried honeycomb body is fired in a state where "a plurality of particles containing silicon as a main component" are in contact with a side surface of the dried honeycomb body. The formed honeycomb body preparing step is a step of extrusion-forming a forming raw material containing a ceramic raw material, to prepare a formed honeycomb body having partition walls to define and form a plurality of cells which become through channels for a fluid and extend from one end surface to the other end surface and an outer peripheral wall positioned in the most outer periphery. The dried honeycomb body preparing step is a step of drying the formed honeycomb body to prepare the dried honeycomb body. The fired honeycomb body preparing step is a step of firing the dried honeycomb body to prepare a fired honeycomb body. The preparing step of the fired honeycomb body with the unfired electrodes is a step in which an electrode forming raw material containing a ceramic raw material is applied to a side surface of the fired honeycomb body and dried to form the unfired electrodes, thereby preparing the fired honeycomb body with the unfired electrodes. The honeycomb structure preparing step is a step of firing the fired honeycomb body with the unfired electrodes to prepare the honeycomb structure.

As described above, in the manufacturing method of the honeycomb structure of the present embodiment, in the fired honeycomb body preparing step, the dried honeycomb body is fired in the state where "the plurality of particles containing silicon as the main component" are in contact with the side surface of the dried honeycomb body. Therefore, when the dried honeycomb body is fired, silicon contained in "the plurality of particles containing silicon as the main component" permeates the honeycomb structure from the side surface thereof, and "a fired honeycomb body having the outer peripheral region impregnated with silicon" can be obtained. Furthermore, there is easily prepared "the outer peripheral region which is a region formed by a material having a lower electrical resistivity than a material constituting a central region". The manufacturing method of the honeycomb structure of the present embodiment is a manufacturing method in a case where the main component of the honeycomb structure body is "a silicon-silicon carbide composite material".

Hereinafter, the manufacturing method of the honeycomb structure of the present embodiment will be described step by step.

(2-1) Formed Honeycomb Body Preparing Step

First, metal silicon powder (metal silicon), a binder, a surfactant, a pore former, water and the like are preferably added to silicon carbide powder (silicon carbide) to prepare the forming raw material. The silicon carbide powder (silicon carbide) and the metal silicon powder (metal silicon) are ceramic raw materials. A mass of the metal silicon powder to a total of a mass of the silicon carbide powder and the mass of the metal silicon powder is preferably from 10 to 40 mass %. An average particle diameter of silicon carbide particles in the silicon carbide powder is preferably from 3 to 50 µm and further preferably from 3 to 40 µm. An average particle diameter of metal silicon (the metal silicon powder) is preferably from 2 to 35 µm. The average particle diameters of the silicon carbide particles and metal silicon (metal silicon particles) are values measured by laser diffraction method. The silicon carbide particles are fine particles of silicon carbide constituting the silicon carbide powder, and the metal silicon particles are fine particles of metal silicon constituting the metal silicon powder. It is to be noted that this is a composition of the forming raw material in a case where the material of the honeycomb structure body is a silicon-silicon carbide composite material, and metal silicon is not added in a case where the material of the honeycomb structure body is silicon carbide.

Examples of the binder include methylcellulose, hydroxypropyl methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. A content of the binder is preferably from 2.0 to 10.0 parts by mass, when a total mass of the silicon carbide powder and the metal silicon powder is 100 parts by mass.

A content of the water is preferably from 20 to 60 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former as long as pores are formed after the firing, and examples of the pore former include graphite, starch, foamable resin, a water-absorbable resin, and silica gel. A content of the pore former is preferably from 0.5 to 10.0 parts by mass, when the total mass of the silicon carbide powder and the metal silicon powder is 100 parts by mass. An average particle diameter of the pore former is preferably from 10 to 30 µm. When the average particle diameter is smaller than 10 µm, the pores may not sufficiently be formed. When the average particle diameter is larger than 30 µm, the die may be clogged during the forming. The average particle diameter of the pore former is a value measured by laser diffraction method.

Next, the forming raw material is preferably kneaded to form a kneaded clay. There is not any special restriction on a method of kneading the forming raw material to form the kneaded clay, and an example of the method is a method using a kneader, a vacuum clay kneader or the like.

Next, the kneaded clay (forming raw material) is extrusion-formed to prepare the formed honeycomb body. During the extrusion-forming, it is preferable to use a die having desirable entire shape, cell shape, partition wall thickness, cell density and the like. As a material of the die, a hard metal which does not easily wear down is preferable. The formed honeycomb body is a structure having partition walls to define and form a plurality of cells which become through channels for a fluid and extend from one end surface to the other end surface, and an outer peripheral wall positioned in the most outer periphery.

A partition wall thickness, a cell density, an outer peripheral wall thickness and the like of the formed honeycomb body can suitably be determined in accordance with a structure of the honeycomb structure of the present invention to be prepared, in consideration of shrinkages in the drying and the firing.

(2-2) Dried Honeycomb Body Preparing Step

The obtained formed honeycomb body is dried. There is not any special restriction on a drying method, and examples of the method include electromagnetic heating systems such as microwave heating drying and high frequency dielectric heating drying, and external heating systems such as hot air drying and superheat steam drying. Among these, it is preferable that a predetermined amount of a water content is dried by the electromagnetic heating system and then the remaining water content is dried by the external heating system, because the whole formed body can rapidly and evenly be dried so that cracks are not generated. As drying conditions, it is preferable that the water content of 30 to 99 mass % of the amount of the water content prior to the drying is removed by the electromagnetic heating system and then the water content is decreased to 3 mass % or less by the external heating system. As the electromagnetic heating system, dielectric heating drying is preferable, and as the external heating system, the hot air drying is preferable. A drying temperature is preferably from 50 to 100° C.

When a length of the formed honeycomb body in the central axis direction is not a desirable length, both end surfaces (both end portions) of the formed honeycomb body are preferably cut to obtain the desirable length. There is not any special restriction on a cutting method, but an example of the method is a method using a round saw cutter or the like.

(2-3) Fired Honeycomb Body Preparing Step

Next, the dried honeycomb body is fired to prepare the fired honeycomb body. Then, during the firing of the dried honeycomb body, the firing is performed in a state where "a plurality of particles containing silicon as a main component" are in contact with a side surface of the dried honeycomb body. Here, "the state where the plurality of particles containing silicon as the main component are in contact with the side surface of the dried honeycomb body" includes a case where the particles containing silicon as the main component directly come in contact with the side surface and a case where the particles are attached to the side surface in a state where other "particles containing silicon as a main component" and the like are interposed between the particles and the side surface. When the particles are attached to the side surface in the state where the other "particles containing silicon as the main component" are interposed between the particles and the side surface, it can be considered that the particles come in contact with the side surface via the other "particles containing silicon as the main component". Furthermore, the main component is a component to be contained as much as 90 mass % or more. Furthermore, during the firing of the dried honeycomb body, it is preferable that "the plurality of particles containing silicon as the main component" are dispersed in a dispersion medium to prepare a dispersion liquid (slurry or paste), and the dispersion liquid is applied to the side surface (the outer peripheral surface) of the dried honeycomb body, followed by the firing. The dispersion liquid is preferably applied to the whole side surface of the dried honeycomb body. In "the plurality of particles containing silicon as the main component", "metal silicon" is contained preferably as much as 50 mass % or more and further preferably as much as 60 mass % or more. Furthermore, the dispersion medium is preferably water, an inorganic adhesive, an organic binder, a surfactant, foamable resin or the like.

An amount of "the plurality of particles containing silicon as the main component" to be in contact with (attached to) the side surface of the dried honeycomb body is preferably from 0.1 to 10 g/cm$^3$ and further preferably from 1 to 5 g/cm$^3$. When the amount is smaller than 0.1 g/cm$^3$, the electrical resistivity of the outer peripheral region of the honeycomb structure may not easily be lowered. When the amount is larger than 10 g/cm³, the electrical resistivity of the outer peripheral region of the honeycomb structure may be excessively low. The above-mentioned unit of "g/cm³" indicates grams (g) per unit area (cm³) of the side surface of the dried honeycomb body.

A content ratio of "the plurality of particles containing silicon as the main component" in the dispersion liquid is preferably from 30 to 90 mass and further preferably from 40 to 85 mass %. When the content ratio is lower than 30 mass %, the electrical resistivity of the outer peripheral region may not easily be lowered. When the content ratio is higher than 90 mass %, the viscosity may be high, and the dispersion liquid may not easily be applied to the dried honeycomb body sometimes. An average particle diameter of "the plurality of particles containing silicon as the main component" is preferably from 2 to 35 µm. The average particle diameter is a value measured by laser diffraction method.

Prior to the firing, calcination is preferably performed to remove the binder and the like. The calcination is preferably performed at 400 to 500° C. in the air atmosphere for 0.5 to 20 hours. There is not any special restriction on a calcination and firing method, and the firing can be performed by using an electric furnace, a gas furnace or the like. As firing conditions, heating is preferably performed at 1400 to 1500° C. in an inert atmosphere of nitrogen, argon or the like for one to 20 hours. Furthermore, after the firing, for enhancement of a durability, an oxygenation treatment is preferably performed at 1200 to 1350° C. for one to ten hours.

(2-4) Preparing Step of Fired Honeycomb Body with Unfired Electrodes

Next, an electrode forming raw material to form electrodes is preferably blended. When the main component of the electrodes is "a silicon-silicon carbide composite material", the electrode forming raw material is preferably formed by adding predetermined additives to silicon carbide powder and silicon powder, followed by the kneading.

Specifically, metal silicon powder (metal silicon), a binder, a surfactant, a pore former, water and the like are preferably added to the silicon carbide powder (silicon carbide) and kneaded to prepare the electrode forming raw material. When a total mass of the silicon carbide powder and metal silicon is 100 parts by mass, the mass of metal silicon is preferably from 20 to 40 parts by mass. An average particle diameter of silicon carbide particles in the silicon carbide powder is preferably from 10 to 60 µm. An average particle diameter of the metal silicon powder (metal silicon) is preferably from 2 to 20 µm. When the average particle diameter of the metal silicon powder (metal silicon) is smaller than 2 µm, the electrical resistivity may be excessively small. When the average particle diameter of the metal silicon powder (metal silicon) is larger than 20 µm, the electrical resistivity may be excessively large. The average particle diameters of the silicon carbide particles and metal silicon (metal silicon particles) are values measured by laser diffraction method. The silicon carbide particles are fine particles of silicon carbide constituting the silicon carbide powder, and the metal silicon particles are fine particles of metal silicon constituting the metal silicon powder.

Examples of the binder include methylcellulose, hydroxypropyl methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. A content of the binder is preferably from 0.1 to 5.0 parts by mass, when a total mass of the silicon carbide powder and the metal silicon powder is 100 parts by mass.

A content of the water is preferably from 15 to 60 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former as long as pores are formed after the firing, and examples of the pore former include graphite, starch, foamable resin, a water-absorbable resin, and silica gel. A content of the pore former is preferably from 0.1 to 5.0 parts by mass, when the total mass of the silicon carbide powder and the metal silicon powder is 100 parts by mass. An average particle diameter of the pore former is preferably from 10 to 30 µm. When the average particle diameter is smaller than 10 µm, the pores may not sufficiently be formed. When the average particle diameter is larger than 30 µm, large pores are easily formed, and then strength deterioration may occur. The average particle diameter of the pore former is a value measured by laser diffraction method.

Next, a mixture obtained by mixing the silicon carbide powder (silicon carbide), metal silicon (the metal silicon powder), the binder, the surfactant, the pore former, the water and the like is preferably kneaded, to obtain the paste-like or slurry-like electrode forming raw material. There is not any special restriction on a kneading method and, for example, a vertical stirrer can be used.

Next, the obtained "electrode forming raw material containing ceramic raw material" is preferably applied to the side surface of the fired honeycomb body. There is not any special restriction on a method of applying the electrode forming raw material to the side surface of the fired honeycomb body but, for example, a printing method can be used. Furthermore, the electrode forming raw material is preferably applied to the side surface of the fired honeycomb body so as to obtain a shape of the electrodes in the honeycomb structure of the above-mentioned present invention. A thickness of each electrode can be set to a desirable thickness by regulating the thickness of the electrode forming raw material during the application thereof. As described above, the electrodes can be formed simply by applying the electrode forming raw material to the side surface of the fired honeycomb body, followed by the drying and the firing, and hence the electrodes can very easily be formed.

Next, the electrode forming raw material applied to the side surface of the fired honeycomb body is preferably dried to form unfired electrodes, thereby preparing the fired honeycomb body with the unfired electrodes. A drying temperature as a drying condition is preferably from 50 to 100° C.

(2-5) Honeycomb Structure Preparing Step

Next, the fired honeycomb body with the unfired electrodes are fired to prepare a honeycomb structure. At this time, the unfired electrodes are mainly fired. Prior to the firing, the calcination is preferably performed to remove the binder and the like. The calcination is preferably performed at 400 to 500° C. in the air atmosphere for 0.5 to 20 hours. There is not any special restriction on a calcination and firing method, and the firing can be performed by using an electric furnace, a gas furnace or the like. As firing conditions, the heating is preferably performed at 1400 to 1500° C. in an inert atmosphere of nitrogen, argon or the like for one to 20 hours. Furthermore, after the firing, for the enhancement of durability, an oxygenation treatment is preferably performed at 1200 to 1350° C. for one to ten hours.

(3) Second Honeycomb Structure Manufacturing Method:

Next, one embodiment of a second honeycomb structure manufacturing method of the present invention will be described.

The one embodiment of the second honeycomb structure manufacturing method of the present invention has a formed honeycomb body preparing step, a dried honeycomb body preparing step, a preparing step of the dried honeycomb body with unfired electrodes, and a honeycomb structure preparing step. The formed honeycomb body preparing step is a step of extrusion-forming a forming raw material containing a ceramic raw material, to prepare a formed honeycomb body having partition walls to define and form a plurality of cells which become through channels for a fluid and extend from one end surface to the other end surface and an outer peripheral wall positioned in the most outer periphery. The dried honeycomb body preparing step is a step of drying the formed honeycomb body to prepare a dried honeycomb body. The preparing step of the dried honeycomb body with unfired electrodes is a step in which an electrode forming raw material containing a ceramic raw material is applied to a side surface of the dried honeycomb body and dried to form the unfired electrodes, thereby preparing the dried honeycomb body with the unfired electrodes. The honeycomb structure preparing step is a step of firing the dried honeycomb body with the unfired electrodes to prepare the honeycomb structure. Furthermore, in the honeycomb structure preparing step, the dried honeycomb body with the unfired electrodes is fired in a state where a plurality of particles containing silicon as a main component are in contact with the side surface of the dried honeycomb body with the unfired electrodes.

As described above, in the manufacturing method of the honeycomb structure of the present embodiment, in the honeycomb structure preparing step, the dried honeycomb body with the unfired electrodes is fired in the state where "the plurality of particles containing silicon as the main component" are in contact with the side surface of the dried honeycomb body with the unfired electrodes. Therefore, when the dried honeycomb body with the unfired electrodes is fired, silicon contained in "the plurality of particles containing silicon as the main component" permeates the dried honeycomb body with the unfired electrodes (honeycomb structure) from the side surface thereof. Furthermore, there is easily formed "the outer peripheral region which is a region formed by a material having a lower electrical resistivity than a material constituting a central region". The manufacturing method of the honeycomb structure of the present embodiment is a manufacturing method in a case where the main component of the honeycomb structure body is "a silicon-silicon carbide composite material".

Hereinafter, the manufacturing method of the honeycomb structure of the present embodiment will be described step by step.

(3-1) Formed Honeycomb Body Preparing Step

The formed honeycomb body preparing step is preferably similar to "the formed honeycomb body preparing step" in the above-mentioned first honeycomb structure manufacturing method of the present invention.

(3-2) Dried Honeycomb Body Preparing Step

The dried honeycomb body preparing step is preferably similar to "the dried honeycomb body preparing step" in the above-mentioned first honeycomb structure manufacturing method of the present invention.

(3-3) Preparing Step of Dried Honeycomb Body with Unfired Electrodes

The preparing step of the dried honeycomb body with the unfired electrodes is preferably "the preparing step of the fired honeycomb body with the unfired electrodes" in the above-mentioned first honeycomb structure manufacturing method of the present invention, wherein "the fired honeycomb body" is replaced with "the dried honeycomb body".

(3-4) Honeycomb Structure Preparing Step

The honeycomb structure preparing step is preferably "the preparing step of the fired honeycomb body" in the above-mentioned first honeycomb structure manufacturing method of the present invention, wherein "the dried honeycomb body" is replaced with "the dried honeycomb body with the unfired electrodes".

In the manufacturing method of the honeycomb structure of the present embodiment, the number of times of the firing is only one in the honeycomb structure preparing step, and hence there is an advantage that the production efficiency is high. On the contrary, in the above-mentioned first manufacturing method of the honeycomb structure of the present invention, there is an advantage that "the plurality of particles containing silicon as the main component" can more evenly be attached to the side surface of the dried honeycomb body.

In the manufacturing method of the honeycomb structure of the present embodiment, when "the plurality of particles containing silicon as the main component" are in contact with the side surface of the dried honeycomb body with the unfired electrodes, "the plurality of particles containing silicon as the main component" is preferably in contact with (attached to) a specific position. The specific position is preferably a portion (a position) of the side surface of the dried honeycomb body on which the unfired electrodes are not disposed.

EXAMPLES

Hereinafter, examples of the present invention will further specifically be described, but the present invention is not limited to these examples.

Example 1

Silicon carbide (SiC) powder and metal silicon (Si) powder were mixed at a mass ratio of 80:20 to prepare a ceramic raw material. Then, to the ceramic raw material, hydroxypropyl methylcellulose as a binder and a water-absorbable resin as a pore former were added, and water was also added to prepare a forming raw material. Then, the forming raw material was kneaded by a vacuum clay kneader to prepare a columnar kneaded clay. The content of the binder was 7 parts by mass when a total of the silicon carbide (SiC) powder and the metal silicon (Si) powder was 100 parts by mass. The content of the pore former was 3 parts by mass when the total of the silicon carbide (SiC) powder and the metal silicon (Si) powder was 100 parts by mass. The content of the water was 42 parts by mass when the total of the silicon carbide (SiC) powder and the metal silicon (Si) powder was 100 parts by mass. The average particle diameter of the silicon carbide powder was 20 μm, and the average particle diameter of the metal silicon powder was 6 μm. Furthermore, the average particle diameter of the pore former was 20 μm. The average particle diameters of silicon carbide, metal silicon and pore former are values measured by laser diffraction method.

The obtained columnar kneaded clay was extruded by using an extrusion-forming machine, to obtain a formed honeycomb body. The obtained formed honeycomb body was dried by high frequency dielectric heating, and then dried at 120° C. for two hours by use of a hot air drier, and both end surfaces of the formed honeycomb body were cut as much as a predetermined amount, to prepare a dried honeycomb body.

Next, a slurry (a dispersion liquid) in which metal silicon powder was dispersed in water was applied to a side surface of the dried honeycomb body. The concentration of the metal silicon powder in the dispersion liquid was 70 mass %. Moreover, the average particle diameter of the metal silicon powder was 15 μm. The average particle diameter is a value measured by laser diffraction method. The amount of the metal silicon powder attached to "the side surface of the dried honeycomb body" was 1 g/cm$^3$ per unit area of the side surface of the dried honeycomb body.

Afterward, the dried honeycomb body to which the dispersion liquid was attached was degreased (calcinated), fired and further subjected to an oxidation treatment to obtain a fired honeycomb body. The degreasing condition was three hours at 550° C. The firing condition was two hours in argon atmosphere at 1450° C. The condition of the oxidation treatment was one hour at 1300° C.

Next, silicon carbide (SiC) powder and metal silicon (Si) powder were mixed at a mass ratio of 60:40, and to this mixture, hydroxypropyl methylcellulose as a binder, glycerin as a moisture retaining agent and a surfactant as a dispersant were added, and water was also added, followed by mixing. The mixture was kneaded to prepare an electrode forming raw material. The content of the binder was 0.5 part by mass when the total of the silicon carbide (SiC) powder and the metal silicon (Si) powder was 100 parts by mass. The content of glycerin was 10 parts by mass when the total of the silicon carbide (SiC) powder and the metal silicon (Si) powder was 100 parts by mass. The content of the surfactant was 0.3 part by mass when the total of the silicon carbide (SiC) powder and the metal silicon (Si) powder was 100 parts by mass. The content of water was 42 parts by mass when the total of the silicon carbide (SiC) powder and the metal silicon (Si) powder was 100 parts by mass. The average particle diameter of the silicon carbide powder was 52 μm, and the average particle diameter of the metal silicon powder was 6 μm. The average particle diameters of silicon carbide and metal silicon are values measured by laser diffraction method. The kneading was performed by using a vertical stirrer.

Next, the electrode forming raw material was applied to the side surface of the fired honeycomb body in a band-like manner to extend between both end surfaces of the fired honeycomb body so that a thickness was 1.5 mm and "the angle of 0.5 times the central angle in a cross section perpendicular to the cell extending direction was 50°". The electrode forming raw material was applied to two portions of the side surface of the fired honeycomb body. Then, in the cross section perpendicular to the cell extending direction, one of the two portions to which the electrode forming raw material was applied was disposed on a side opposite to the other portion via a center of the fired honeycomb body.

Next, the electrode forming raw material applied to the fired honeycomb body was dried, to obtain the fired honeycomb body with unfired electrodes. The drying temperature was 70° C.

Afterward, the fired honeycomb body with the unfired electrodes was degreased (calcinated), fired and further subjected to an oxidation treatment to obtain a honeycomb structure. The degreasing condition was three hours at 550° C. The firing condition was two hours in an argon atmosphere at 1450° C. The condition of the oxidation treatment was one hour at 1300° C.

The average pore diameter (pore diameter) of partition walls of the obtained honeycomb structure was 8.6 μm, and the porosity was 45%. The average pore diameter and the porosity are values measured by mercury porosimeter. Furthermore, the honeycomb structure had a partition wall thickness of 90 μm and a cell density of 90 cells/cm$^2$. Furthermore, the bottom surface of the honeycomb structure had a round shape with a diameter of 93 mm, and a length of the honeycomb structure in the cell extending direction was 75 mm. Furthermore, the isostatic strength of the obtained honeycomb structure was 2.5 MPa. The isostatic strength is a breaking strength measured under static pressure in water. Furthermore, the angle of 0.5 times the central angle of each of two electrodes in the cross section of the honeycomb structure which was perpendicular to the cell extending direction was 50°. Furthermore, the thickness of each of the two electrodes was 0.15 mm. Furthermore, the electrical resistivity of the electrodes was 1.3 Ωcm, the electrical resistivity of the central region of the honeycomb structure body was 35 Ωcm, and the electrical resistivity of the outer peripheral region was 20 Ωcm. The radius of the cross section of the central region which was perpendicular to the cell extending direction (central region radius) was 25 mm. The central region radius is a distance from the center O to the outer periphery of the central region in the cross section perpendicular to the cell extending direction. Furthermore, the outer peripheral region had a boundary region. The thickness of the boundary region was 10 mm. The electrical resistivity of the boundary region gradually lowered from "the end on the side of the outer peripheral region" to "the boundary with the central region". The electrical resistivities are values measured by four-terminal method.

Figure 6:
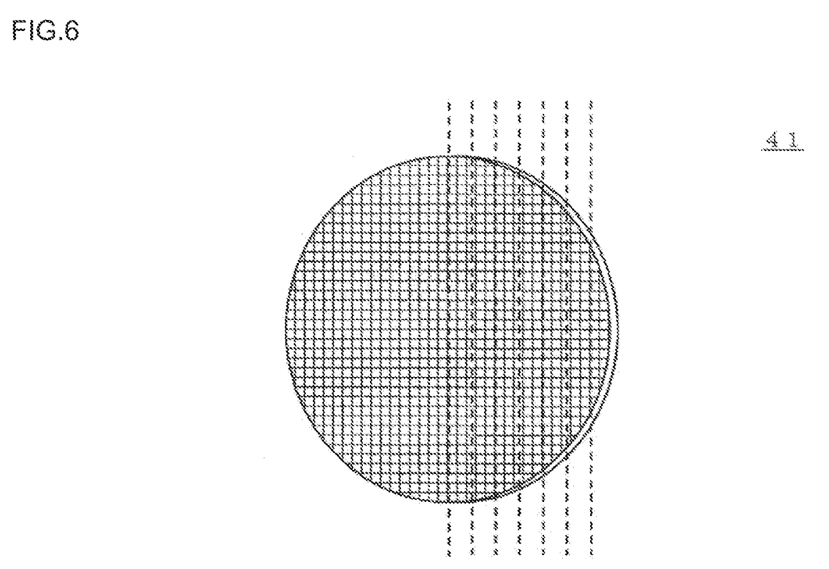
FIG. 6 is a disc formed by cutting the honeycomb structure of Example 1 in round slices.
Figure 7:
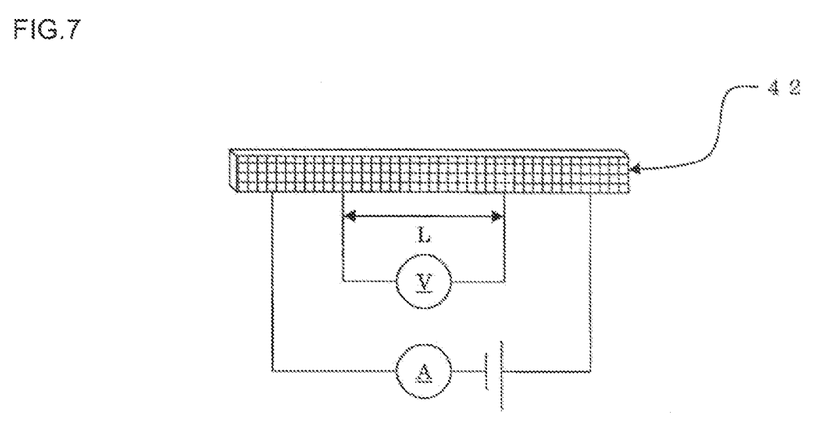
FIG. 7 shows a rod-like sample cut out from the honeycomb structure of Example 1.

Additionally, the electrical resistivity of each of the central region and the outer peripheral region of the honeycomb structure body and that "the electrical resistivity of the boundary region gradually changed" were observed by the following method. The honeycomb structure body was cut into round slices so as to form a disc (disc 41, refer to FIG. 6) having a cross section perpendicular to the cell extending direction and having a thickness of 1 cm. The discs were cut out from three portions of "both end portions and the central portion" of the honeycomb structure body in "the cell extending direction". Then, as shown in FIG. 6, each of the discs 41 was cut into each width of 3 mm along a straight line passing the center of "the end surface of the disc 41" and straight lines parallel to the straight line, to prepare a plurality of rod-like samples 42 as shown in FIG. 7. In FIG. 6, "the straight line passing the center of the end surface of the disc 41 and the straight lines parallel to the straight line" are shown by broken lines. Furthermore, the above-mentioned "width of 3 mm" means that the distance between the straight lines shown by the broken lines in FIG. 6 is 3 mm.

Then, as shown in FIG. 7, a voltage was applied to each of the rod-like samples 42, and a volume resistivity (electrical resistivity) of a range of a length L in the central portion was obtained (4-lines resistance type measurement). The length L was 4 cm. The rod-like samples 42 cut out from "the same position in each of the three discs 41" are to be "the rod-like samples of the same position". That is, three "rod-like samples of the same position" are present (one sample can be taken from each disc). Then, an average value of the electrical resistivities of the three "rod-like samples of the same position" was taken, to obtain the electrical resistivity of the position. In consequence, the electrical resistivities of the central region and the outer peripheral region of the honeycomb structure body were confirmed, and it was confirmed that the electrical resistivity of the boundary region gradually changed. FIG. 6 shows the disc 41 formed by cutting the honeycomb structure of Example 1 into the round slices. FIG. 7 shows the rod-like sample 42 cut out from the honeycomb structure of Example 1.

Furthermore, the electrical resistivity of each electrode was measured by the following method. A test piece of 10 mm×10 mm×50 mm was prepared by using the same material as the electrodes. A silver paste was applied to the whole surfaces of both end portions of the test piece, so that it was possible to energize the test piece via a wiring line. The test piece was connected to a voltage applying current measuring device to apply a voltage to the test piece. A thermocouple was disposed in a central region of the test piece, and a change of a temperature of the test piece during the application of the voltage with an elapse of time was confirmed by a recorder. A voltage of 100 to 200 V was applied, a current value and a voltage value were measured in a state where the test piece temperature was 400° C., and the electrical resistivity was calculated from the obtained current value and voltage value and the test piece dimension.

As to the obtained honeycomb structure, "the highest temperature of the honeycomb structure body" was measured by the following method. The results are shown in Table 1.

(Highest Temperature of Honeycomb Structure Body)
(Highest Temperature)

First, a voltage of 200 V was applied to the honeycomb structure, to carry out an energization test. Then, the highest temperature of the honeycomb structure body was measured during the test. When the highest temperature of the honeycomb structure body is 200° C. or less, it can be considered that the unevenness of the temperature distribution in the honeycomb structure is inhibited. The measurement of the highest temperature is performed as follows. That is, there are measured temperatures at "a position in contact with each end portion of each electrode (end portion in a peripheral direction) and a position in contact with a central point of the electrode in the peripheral direction in the cross section perpendicular to the cell extending direction" of the honeycomb structure body during the application of the voltage of 200 V to the honeycomb structure, and the highest temperature of these temperatures is obtained as the highest temperature. It is to be noted that one of the position in contact with the end portion of the electrode (end portion in the peripheral direction) and the position in contact with the central point of the electrode in the peripheral direction in the honeycomb structure body is a position where the current flows most, and the position is a portion of the highest temperature in the honeycomb structure.

Examples 2 to 9 and Comparative Example 1

The procedures of Example 1 were repeated except that electrical resistivities (of materials) of the central region and the outer peripheral region, the radius of the central region (radius in a cross section perpendicular to a cell extending direction) and the thickness of a boundary region were changed as shown in Table 1, to prepare the honeycomb structures. In the same manner as in Example 1, "the highest temperature of the honeycomb structure body" of each of the honeycomb structures was measured. The results are shown in Table 1.

It can be seen from Table 1 that when the electrical resistivity of the material constituting the outer peripheral region is lower than the electrical resistivity of the material constituting the central region, the unevenness of the temperature distribution during the application of the voltage can be inhibited.

A honeycomb structure of the present invention can suitably be utilized as a catalyst carrier for an exhaust gas purifying device which purifies an exhaust gas of a car.

DESCRIPTION OF REFERENCE SYMBOLS

1: partition wall, 2: cell, 3: outer peripheral wall, 4: honeycomb structure body, 5: side surface, 6: central region, 7: outer peripheral region, 8: boundary region, 8a: boundary with the central region, 8b: end on the side of the outer peripheral region, 11: inflow end surface, 12: outflow end surface, 21: electrode, 41: disc, 42: rod-like sample, 100 and 200: honeycomb structure, O: center, α: central angle, β: angle, θ: angle of 0.5 times the central angle, and L: length.

What is claimed is:
1. A honeycomb structure comprising:
a tubular honeycomb structure body having porous partition walls to define and form a plurality of cells which become through channels for a fluid and extend from an inflow end surface which is an end surface on an inflow side of the fluid to an outflow end surface which is an end surface on an outflow side of the fluid, and an outer peripheral wall positioned in the outermost periphery; and a pair of electrodes disposed on a side surface of the tubular honeycomb structure body,
wherein an electrical resistivity of the tubular honeycomb structure body is from 1 to 200 Ωcm,
each of the pair of electrodes is formed into a band-like shape extending in an extending direction of the plurality of cells of the tubular honeycomb structure body, and

TABLE 1

|  | Central region radius (mm) | Thickness of boundary region (mm) | Electrical resistivity of central region (Ωcm) | Electrical resistivity of outer peripheral region (Ωcm) | Highest temp. ° C. |
|---|---|---|---|---|---|
| Example 1 | 25 | 10 | 35 | 20 | 180 |
| Example 2 | 30 | 10 | 35 | 20 | 185 |
| Example 3 | 35 | 10 | 35 | 20 | 193 |
| Example 4 | 25 | 5 | 35 | 20 | 185 |
| Example 5 | 25 | 15 | 35 | 20 | 175 |
| Example 6 | 25 | 10 | 30 | 20 | 188 |
| Example 7 | 25 | 10 | 25 | 20 | 190 |
| Example 8 | 25 | 10 | 35 | 25 | 195 |
| Example 9 | 25 | 10 | 35 | 30 | 201 |
| Comparative Example 1 | 0 | 0 | Electrical resistivity of honeycomb structure body 35 Ωcm | | 210 | in a cross section perpendicular to the extending direction of the plurality of cells, one electrode in the pair of electrodes is disposed on a side opposite to the other electrode in the pair of electrodes via a center of the tubular honeycomb structure body, the tubular honeycomb structure body is constituted of an outer peripheral region including the side surface and a central region as a region of the center which excludes the outer peripheral region, and an electrical resistivity of a material constituting the outer peripheral region is lower than an electrical resistivity of a material constituting the central region.

2. The honeycomb structure according to claim 1, wherein the tubular honeycomb structure body and the electrodes are made of a material including silicon carbide.

3. The honeycomb structure according to claim 1, wherein in the cross section perpendicular to the extending direction of the plurality of cells, a length of a current path is 1.6 times or less a diameter of the tubular honeycomb structure body.

4. The honeycomb structure according to claim 2, wherein in the cross section perpendicular to the extending direction of the plurality of cells, a length of a current path is 1.6 times or less a diameter of the tubular honeycomb structure body.

5. The honeycomb structure according to claim 1, wherein the outer peripheral region has a boundary region in a boundary portion between the outer peripheral region and the central region, and the boundary region is a region where the electrical resistivity gradually changes so that the electrical resistivity lowers toward the closer boundary portion to the central region.

6. The honeycomb structure according to claim 2, wherein the outer peripheral region has a boundary region in a boundary portion between the outer peripheral region and the central region, and the boundary region is a region where the electrical resistivity gradually changes so that the electrical resistivity lowers toward the closer boundary portion to the central region.

7. The honeycomb structure according to claim 3, wherein the outer peripheral region has a boundary region in a boundary portion between the outer peripheral region and the central region, and the boundary region is a region where the electrical resistivity gradually changes so that the electrical resistivity lowers toward the closer boundary portion to the central region.

8. The honeycomb structure according to claim 4, wherein the outer peripheral region has a boundary region in a boundary portion between the outer peripheral region and the central region, and the boundary region is a region where the electrical resistivity gradually changes so that the electrical resistivity lowers toward the closer boundary portion to the central region.

9. A manufacturing method of a honeycomb structure having:

a formed tubular honeycomb structure body preparing step of extrusion-forming a forming raw material containing a ceramic raw material, to prepare a formed tubular honeycomb structure body having partition walls to define and form a plurality of cells which become through channels for a fluid and extend from one end surface which is an end surface on an inflow side of the fluid to the other end surface which is an end surface on the outflow side of the fluid and an outer peripheral wall positioned in the outermost periphery;

a dried tubular honeycomb structure body preparing step of drying the formed tubular honeycomb structure body to prepare a dried tubular honeycomb structure body;

a fired tubular honeycomb structure body preparing step of firing the dried tubular honeycomb structure body to prepare a fired tubular honeycomb structure body;

a preparing step of the fired tubular honeycomb structure body with a pair of unfired electrodes in which an electrode forming raw material containing a ceramic raw material is applied to a side surface of the fired tubular honeycomb structure body and dried to form the pair of unfired electrodes, thereby preparing the fired tubular honeycomb structure body with the pair of unfired electrodes; and a tubular honeycomb structure body preparing step of firing the fired tubular honeycomb structure body with the pair of unfired electrodes to prepare the tubular honeycomb structure body, wherein in the fired tubular honeycomb structure body preparing step, the dried tubular honeycomb structure body is fired in a state where a plurality of particles containing silicon as a main component are in contact with the side surface of the dried tubular honeycomb structure body, and wherein an electrical resistivity of the tubular honeycomb structure body is from 1 to 200 Ωcm, each of the pair of electrodes is formed into a band-like shape extending in an extending direction of the plurality of cells of the tubular honeycomb structure body, and in a cross section perpendicular to the extending direction of the plurality of cells, one electrode in the pair of electrodes is disposed on a side opposite to the other electrode in the pair of electrodes via a center of the tubular honeycomb structure body, the tubular honeycomb structure body is constituted of an outer peripheral region including the side surface and a central region as a region of the center which excludes the outer peripheral region, and an electrical resistivity of a material constituting the outer peripheral region is lower than an electrical resistivity of a material constituting the central region.

10. A manufacturing method of a honeycomb structure having:

a formed tubular honeycomb structure body preparing step of extrusion-forming a forming raw material containing a ceramic raw material, to prepare a formed tubular honeycomb structure body having partition walls to define and form a plurality of cells which become through channels for a fluid and extend from one end surface which is an end surface on an inflow side of the fluid to the other end surface which is an end surface on an outflow side of the fluid and an outer peripheral wall positioned in the outermost periphery;

a dried tubular honeycomb structure body preparing step of drying the formed tubular honeycomb structure body to prepare a dried tubular honeycomb structure body;

a preparing step of the dried tubular honeycomb structure body with a pair of unfired electrodes in which an electrode forming raw material containing a ceramic raw material is applied to a side surface of the dried tubular honeycomb structure body and dried to form the pair of unfired electrodes, thereby preparing the dried tubular honeycomb structure body with the pair of unfired electrodes; and a tubular honeycomb structure body preparing step of firing the dried tubular honeycomb structure body with the pair of unfired electrodes to prepare the tubular honeycomb structure body, wherein in the tubular honeycomb structure body preparing step, the dried tubular honeycomb structure body with the unfired electrodes is fired in a state where a plurality of particles containing silicon as a main component are in contact with the side surface of the dried tubular honeycomb structure body with the pair of unfired electrodes, and wherein an electrical resistivity of the tubular honeycomb structure body is from 1 to 200 Ωcm, each of the pair of electrodes is formed into a band-like shape extending in an extending direction of the plurality of cells of the tubular honeycomb structure body, and in a cross section perpendicular to the extending direction of the plurality of cells, one electrode in the pair of electrodes is disposed on a side opposite to the other electrode in the pair of electrodes via a center of the tubular honeycomb structure body, the tubular honeycomb structure body is constituted of an outer peripheral region including the side surface and a central region as a region of the center which excludes the outer peripheral region, and an electrical resistivity of a material constituting, the outer peripheral region is lower than an electrical resistivity of a material constituting the central region.

* * * * *